O. F. Stedman,

Watch Dust Cap.

No 2,953. Reissued May 26, 1868.

Witnesses:

A. D. Stockbridge

L. S. Seaman

Inventor.

per O. F. Stedman

Alexander Hewson

Atty.

N. PETERS, PHOTO-LITHOGRAPHER, WASHINGTON, D. C.

United States Patent Office.

O. F. STEDMAN, OF RAVENNA, OHIO.

*Letters Patent No.* 73,937, *dated January* 28, 1868; *reissue No.* 2,953, *dated May* 26, 1868.

IMPROVEMENT IN WATCHES.

The Schedule referred to in these Letters Patent and making part of the same.

TO ALL WHOM IT MAY CONCERN:

Be it known that I, O. F. STEDMAN, of Ravenna, in the county of Portage, and in the State of Ohio, have invented a certain new and useful Improvement in Watches; and I do hereby declare that the following is a full, clear, and exact description thereof, reference being had to the accompanying drawings, and the letters of reference marked thereon.

Figure 1:
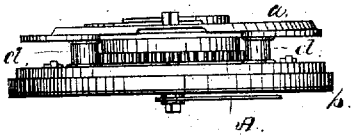
Figure 2:
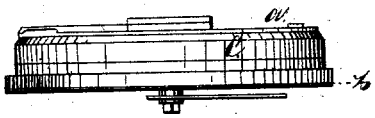
Figure 3:
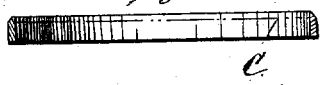
Figure 4:
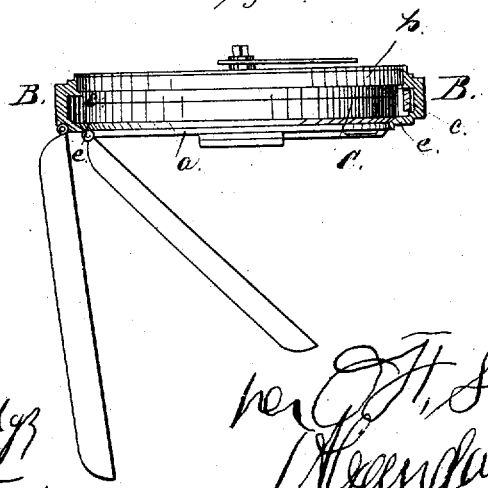

In the annexed drawings, making a part of this specification, Figure 1 represents the movement of a "hunting-case American watch," called "full plate," or close movement, in which the running parts, A, are held by and between two plates, *a* and *b*, which are themselves supported and held together by pillar-posts, *d d*, thereby leaving the movement open at the edge, between the two plates *a* and *b*. These movements are fitted into a case-frame, B, made open, front and back, said openings being closed by caps, shutting upon case-frame B. The front opening of the case-frame B corresponds in diameter to that of the front or face-plate *b* of the movement, and the back opening corresponds in like manner to the diameter of the back plate *a* of the movement, and has a groove or space, *e*, in which are adjusted springs for opening the caps of the case.

C represents a metallic ring or band, the inner diameter of which corresponds with the diameter of the back plate *a* of the movement, and made with an enlargement or bulge, to correspond with and accommodate the main wheel of the watch, which projects a little beyond the edge of the plate *a*. The band C is slipped or adjusted around so as to embrace the movement, one edge resting against the back of the face-plate *b*, and being just wide enough to close the space between the plates *a* and *b*, and being bevelled at the back side to correspond with the bevelled edge *e* of the case-frame B.

It will be seen that the diameter of the movement, at the points where it fits within the openings of the case-frame B, is the same whether the band C be adjusted or not.

The band C may be held in place by means of pins or other suitable device, and when so placed and held as above described, completely shields the works from the dirt that otherwise might readily find its way thereto through the slots or openings at the hinges of the caps of the case-frame B, and where the springs of said caps are adjusted, and thence along the groove *e*, and into the works at any point between the plates *a* and *b*.

It is obvious that the ring or band C, constructed as above described, can be used on any "full-plate" movement of an "American watch," without the change or modification of any part of the same, or of the case thereof, and the bevel of the edge, corresponding with the bevel *e* of the case-frame B, prevents the movement from falling or passing too far through the back opening of the case-frame B, and holds it in place in a steady and secure manner.

Having thus fully described my invention, what I claim as new, and desire to secure by Letters Patent, is—

The ring or band C, bevelled or made thin at one edge or side, said band being made narrower than the movement, and wide enough to cover the space between the plates *a* and *b*, substantially as and for the purposes herein set forth.

In testimony that I claim the foregoing, I have hereunto set my hand, this 18th day of March, 1868.

O. F. STEDMAN.

Witnesses:

H. C. KINGSBURY,

Z. C. YOUNG.